US011243926B2

(12) United States Patent
Calvo et al.

(10) Patent No.: US 11,243,926 B2
(45) Date of Patent: *Feb. 8, 2022

(54) COMPLIANCE LIFECYCLE MANAGEMENT FOR CLOUD-BASED RESOURCES

(71) Applicant: Amazon Technologies, Inc., Seattle, WA (US)

(72) Inventors: Angel Calvo, Seattle, WA (US); Boo Boon Khoo, Bellevue, WA (US); Himanshu Sharma, Bellevue, WA (US); Siddharth Gupta, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/200,597

(22) Filed: Mar. 12, 2021

(65) Prior Publication Data

US 2021/0271651 A1 Sep. 2, 2021

Related U.S. Application Data

(63) Continuation of application No. 16/364,006, filed on Mar. 25, 2019, now Pat. No. 10,949,406.

(51) Int. Cl.
*G06F 16/215* (2019.01)
*H04L 12/24* (2006.01)
(Continued)

(52) U.S. Cl.
CPC .......... *G06F 16/215* (2019.01); *G06F 21/552* (2013.01); *H04L 41/0843* (2013.01);
(Continued)

(58) Field of Classification Search
CPC .... G06F 16/215; G06F 9/4856; G06F 9/5072; G06F 21/552; G06F 21/52; G06F 21/604;
(Continued)

(56) References Cited

U.S. PATENT DOCUMENTS 7,809,667 B1 * 10/2010 Yehuda ................. G06F 21/552
706/47
8,244,777 B1 8/2012 Vijendra et al.
(Continued)

OTHER PUBLICATIONS

Sara Duffer, "Introducing AWS Artifact: Speeding Access to Compliance Reports", Retrieved from https://aws.amazon.com/blogs/security/introducing-aws-artifact-speeding-access-to-compliance-reports/, Dec. 7, 2016, pp. 1-3.

*Primary Examiner* — Kyung H Shin
(74) *Attorney, Agent, or Firm* — Robert C. Kowert; Kowert, Hood, Munyon, Rankin & Goetzel, P.C.

(57) ABSTRACT

Methods, systems, and computer-readable media for compliance lifecycle management for cloud-based resources are disclosed. A selection is received of a compliance pack from a plurality of compliance packs. The compliance pack comprises a plurality of rules associated with policy compliance. The compliance pack is selected from the plurality of compliance packs via a user interface. The selection is associated with one or more resources hosted in one or more provider networks. An evaluation is performed of compliance of the one or more resources with respect to the plurality of rules of the compliance pack. Data describing the evaluation is generated and displayed. The data comprises an aggregate compliance status for at least one of the one or more resources, and the aggregate compliance status represents an aggregate compliance with the plurality of rules.

20 Claims, 10 Drawing Sheets

(51) Int. Cl.
    *G06F 21/55* (2013.01)
    *H04L 29/06* (2006.01)
    *H04L 29/08* (2006.01)
    *G06F 9/48* (2006.01)
    *H04L 12/64* (2006.01)
    *G06F 9/50* (2006.01)

(52) U.S. Cl.
    CPC ...... H04L 41/0853 (2013.01); H04L 41/0869 (2013.01); H04L 41/0893 (2013.01); H04L 63/0823 (2013.01); H04L 63/0876 (2013.01); H04L 67/1002 (2013.01); *G06F 9/4856* (2013.01); *G06F 9/5072* (2013.01); *H04L 12/6418* (2013.01)

(58) Field of Classification Search
    CPC ............ H04L 67/1002; H04L 12/6418; H04L 63/0876; H04L 63/1433; H04L 63/0853; H04L 63/083; H04L 63/12; H04L 63/0227; H04L 63/102
See application file for complete search history.

(56) References Cited

U.S. PATENT DOCUMENTS

| | | | |
|---|---|---|---|
| 8,346,683 | B2 | 1/2013 | Dybala et al. |
| 8,489,500 | B2 | 7/2013 | de Jonge et al. |
| 9,053,441 | B2 | 6/2015 | Sebald |
| 9,058,606 | B1 | 6/2015 | Tulek et al. |
| 9,967,285 | B1 | 5/2018 | Rossman et al. |
| 10,049,367 | B2 | 8/2018 | Creager et al. |
| 10,127,511 | B1 | 11/2018 | Epstein et al. |
| 10,171,310 | B2 | 1/2019 | Hernandez et al. |
| 10,185,833 | B2 | 1/2019 | Hale et al. |
| 10,218,697 | B2 * | 2/2019 | Cockerill ............ H04L 63/0876 |
| 10,949,406 | B1 | 3/2021 | Calvo et al. |
| 2012/0290544 | A1 * | 11/2012 | Abuelsaad ............ G06F 16/215 707/694 |
| 2015/0249707 | A1 * | 9/2015 | Morgan ............ H04L 67/1002 709/226 |

\* cited by examiner

COMPLIANCE LIFECYCLE MANAGEMENT FOR CLOUD-BASED RESOURCES

This application is a continuation of U.S. patent application Ser. No. 16/364,006, filed Mar. 25, 2019, which is hereby incorporated by reference herein its entirety.

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of provisioning, administering, and managing the computing resources have become increasingly complicated.

Figure 1A:
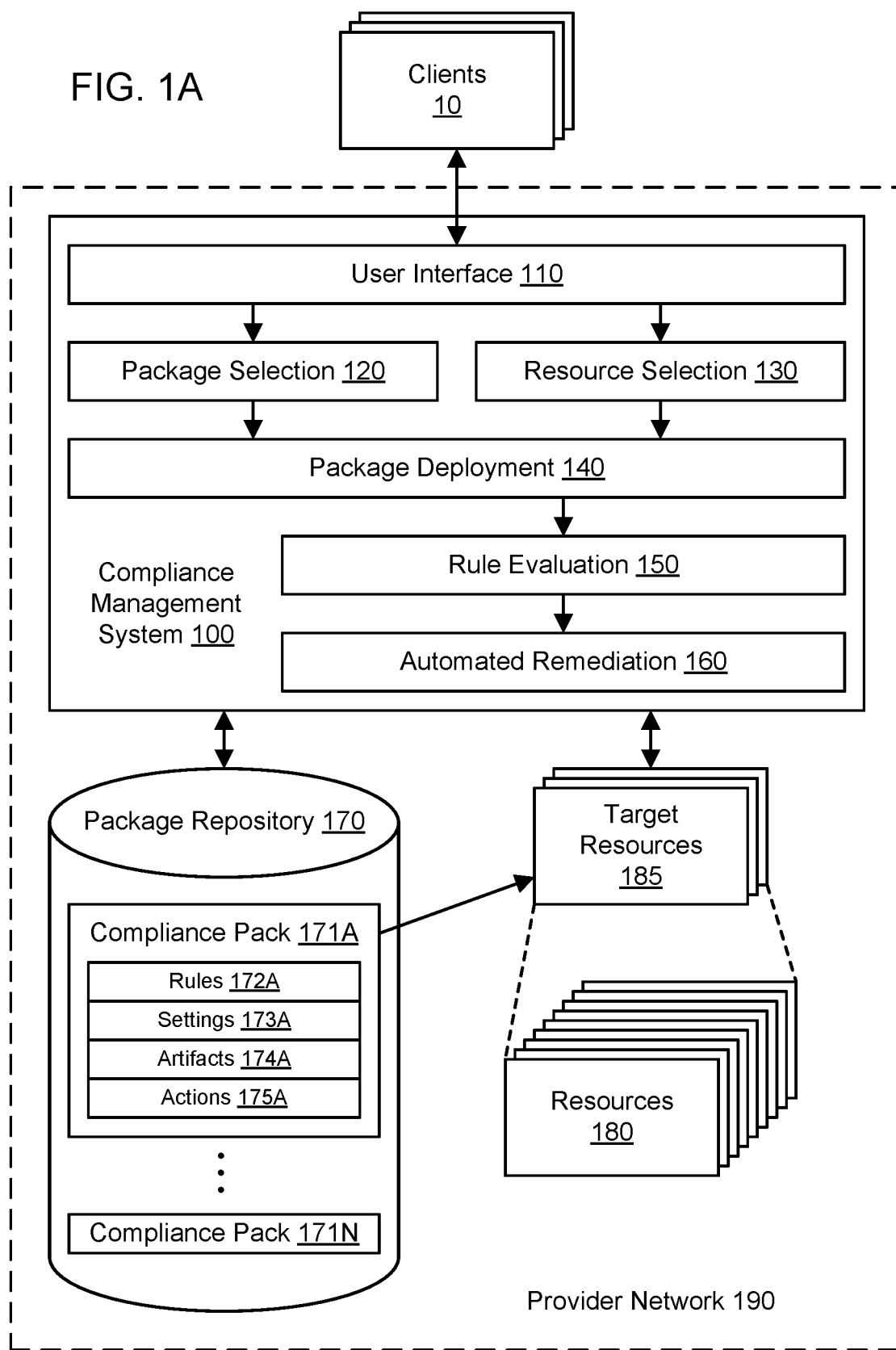
FIG. 1A and FIG. 1B illustrate example system environments for compliance lifecycle management for cloud-based resources, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for compliance lifecycle management for cloud-based resources are described. Cloud-based resources may include computational resources (e.g., virtual compute instances), applications, services, web servers, databases, and so on. Such resources may be subject to compliance requirements. The requirements may be issued by a governmental body or an industry standards organization or promulgated internally within a business entity. For example, a resource that uses or accesses sensitive healthcare data may be expected to comply with requirements of the Health Insurance Portability and Accountability Act (HIPAA). As another example, processing of personal data in some jurisdictions may be subject to the General Data Protection Regulation (GDPR). As a further example, the Payment Card Industry Data Security Standard (PCI DSS) may be applicable to companies that process credit-card data. Additionally, a business entity may seek to enforce best practices for software design in its products. Using prior approaches, developers and managers of such resources often needed to work with a variety of disparate tools to manage an end-to-end compliance lifecycle. The tools often lacked standardization and/or required custom automation scripts or manual processes. Furthermore, developers and managers often needed to evaluate compliance on a rule-by-rule basis, even when a particular standard (e.g., HIPAA, GDPR, PCI) included a large number of applicable rules. Such approaches were complex, time-consuming, resource-consuming, and potentially prone to human error when manually implemented.

Using the techniques described herein, a common model and common framework may be used for managing the compliance lifecycle of resources hosted in the cloud in a simplified and efficient manner. A lifecycle of resource compliance may include various stages from policy definition to auditing to reporting. A compliance management system may permit a compliance package to be applied to one or more resources in one or more multi-tenant provider networks, including one or more regions of such networks. A compliance package (also referred to as a compliance pack, policy compliance pack, conformance pack, or governance pack) may include settings, rules, artifacts (e.g., documentation of compliance standards), and remedial actions to be taken if resources are found to be noncompliant. For example, a compliance pack associated with PCI may include multiple rules that can be evaluated to determine whether a resource is compliant with credit-card security standards. Pre-built compliance packs may be selected by clients from a repository or marketplace. Compliance packs may also be customized by clients from a template or designed from scratch. The compliance management system may report compliance statuses for individual rules and/or an aggregate compliance status across a plurality of rules. Rules in a compliance pack may be evaluated again and again to enforce continuous compliance of resources. Remedial actions for noncompliance may include notifying relevant users, modifying a configuration of a resource, isolating a resource, and so on. Using the compliance management system described herein, users may easily select and deploy compliance packs to cloud-based resources to determine the policy compliance of those resources. In some embodiments, a user may deploy a compliance pack with a single click (or other operation) in a user interface, even across an entire enterprise, and have access to a unified view of compliance across the target resources.

As one skilled in the art will appreciate in light of this disclosure, embodiments may be capable of achieving certain technical advantages, including some or all of the following: (1) improved use of computational resources by providing simplified selection and deployment of compliance packs that include multiple rules; (2) reduced latency of compliance evaluation through simplification of compliance package authoring, selection, and deployment; (3) improved accuracy of aggregate compliance scoring for multiple rules by evaluating the rules through a common framework; (4) improved security and policy compliance through automated remediation of noncompliant resources; (5) reducing the complexity of authoring compliance packs by using a common model for packs; (6) improving the interoperability of the compliance management system with external systems and experts by producing output artifacts that capture the policy compliance of resources with respect to sets of rules; and so on.

Figure 1B:
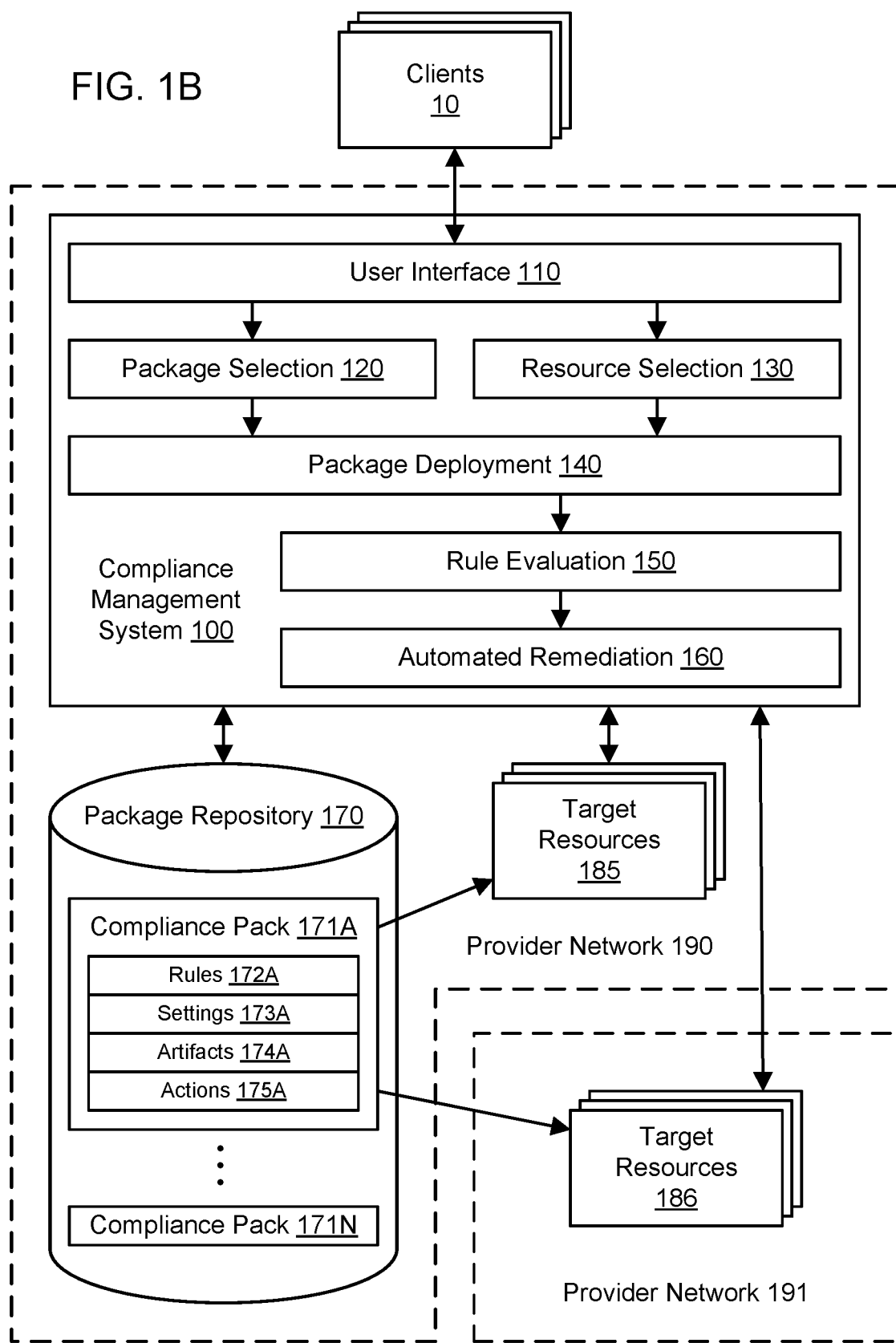

FIG. 1A and FIG. 1B illustrate example system environments for compliance lifecycle management for cloud-based resources, according to some embodiments. A compliance management system 100 may permit users to manage the compliance lifecycle of resources hosted in the cloud in a simplified and efficient manner. The compliance management system 100 may perform management of resources 180 such as computational resources (e.g., virtual compute instances), applications, services, processes, web servers, database instances, networking components, and so on. The resources 180 may termed "cloud-based" and may be hosted in the cloud. The resources 180 may be hosted in one or more multi-tenant provider networks such as networks 190 and 191. The resources 180 may be accessed from inside or outside the provider networks (e.g., via one or more public networks such as the Internet and/or one or more private networks) by resource owners or other provider network clients, such as clients 10. The provider network(s) may operate the resources on behalf of resource owners. Resource owners may include entities that own particular resources or lease particular resources, e.g., from an operator of a provider network. A provider network may be termed "multi-tenant" if its resources are offered to and used by multiple clients concurrently. Clients 10 that interact with the compliance management system 100 may include resource owners, resource developers, compliance managers, other users, and so on. A user with access to a master account may have the ability to manage the policy compliance of resources associated with subsidiary accounts of the master account, e.g., in an enterprise-wide manner.

In some embodiments, the compliance management system 100 may use a common framework to perform tasks associated with multiple stages of an end-to-end compliance lifecycle. For example, the compliance management system 100 may perform policy definition tasks. As another example, the compliance management system 100 may perform policy evaluation tasks. As yet another example, the compliance management system 100 may perform reporting and notification tasks. As a further example, the compliance management system 100 may perform remediation tasks for noncompliant resources. Various tasks at various stages of the compliance lifecycle may be performed according to a compliance package, also referred to as a compliance pack. The tasks associated with a compliance pack may be performed with respect to one or more resources in one or more provider networks or regions of provider networks. Using a user interface 110 such as a graphical user interface (GUI) or command line interface (CLI), a client may simply select a compliance pack from a list or marketplace (or author a custom compliance pack), select the account(s) or target resources to which the compliance pack should be applied, and deploy the compliance pack to the selected account(s) or resources. After the selection is made by the client, the compliance management system 100 may perform automated tasks to deploy a selected compliance pack, evaluate rules, potentially remediate any noncompliance, and report results back to the client (e.g., in the user interface 110).

For example, as shown in FIG. 1A, a client may use a package selection component 120 to select a particular compliance pack 171A from a list or set of packs 171A-171N offered by a package repository. The client may also use a resource selection component 130 to select a set of target resources 185 from the resources 180 of the provider network 190. In one embodiment, the resource selection 130 may be performed according to a scope associated with a selected pack. For example, the scope may identify a class of resources to which the pack should be deployed, and the resource selection 130 may automatically select such resources that are accessible to the user account. Within a particular provider network 190, target resources 185 may represent a selected portion of the resources 180 or all of the resources 180. Target resources 185 may be associated with one or more accounts for which the user has sufficient access privileges to perform compliance management tasks. For example, if a user has sufficient access to a master account for an enterprise, then the user may deploy a compliance pack to the entire enterprise in a simple operation and then view the results of the deployment via a console associated with the master account. In one embodiment, a compliance pack may be deployed to particular regions or divisions of a provider network or other enterprise. As shown in FIG. 1B, the client may use the resource selection component 130 to select a set of target resources 185 from the resources 180 of the provider network 190 and also select another set of target resources 186 of another provider network 191. The selected compliance pack 171A may be deployed to both the resources 185 and the resources 186. The other provider network 191 may represent another multi-tenant, cloud-based provider network or a client-hosted (on-premises) environment.

As also shown in FIG. 1A, the selected compliance pack 171A may be deployed to the selected resources 185 using a package deployment component 140. In deploying a compliance pack to a set of resources, the package deployment 140 may store an association between the selected compliance pack 171A and the target resources 185. For each of the target resources 185, the system 100 may perform rule evaluation 150 for all the rules 172A in the compliance pack 171A. Rule evaluation 150 may include gathering relevant data that the rules 172A require as input and then determining whether the resource is compliant or noncompliant with the rule. For resources found to be noncompliant, the system 100 may perform automated remediation 160. The automated remediation 160 may include performing one or more of the remedial actions 175A as associated with the relevant rule(s) in the compliance pack 171A. Remedial actions 175A may result in notification of noncompliance to relevant users or other notification targets. Remedial actions 175A may place a previously noncompliant resource in compliance with the rules 172A.

In the case of continuous compliance management, the stored association between the compliance pack 171A and the target resources 185 may be re-used in performing the rule evaluation 150 (and automated remediation 160) repeatedly over time. In various embodiments, the rule evaluation 150 may be performed when the compliance pack 171A is first deployed, when a new resource is provisioned in the target resources, and/or according to a schedule associated with the pack 171A. For example, if the compliance pack 171A has been deployed with a particular account that owns a resource group, and a new resource is added to the resource group, then the system 100 may automatically evaluate the new resource with respect to the rules 172A. In one embodiment, the system 100 may use an anti-entropy mechanism to verify the membership of the target resources 185 before re-applying the rules 172A. For example, if a resource has been moved out of the account associated with the target resources 185, then the compliance pack 171A may be automatically undeployed from that resource.

Compliance packs 171A-171N may capture compliance requirements for various standards or policies. The requirements may be issued by a governmental body or an industry standards organization or promulgated internally within a business entity. For example, a resource that uses or accesses sensitive health-care data may be expected to comply with requirements of the Health Insurance Portability and Accountability Act (HIPAA), and a HIPAA-related compliance pack may include multiple rules for verifying HIPAA compliance. As another example, processing of personal data in some jurisdictions may be subject to the General Data Protection Regulation (GDPR), and a GDPR-related compliance pack may include multiple rules for verifying GDPR compliance. As a further example, the Payment Card Industry Data Security Standard (PCI DSS) may be applicable to companies that process credit-card data, and a PCI-related compliance pack may include multiple rules for verifying PCI compliance. Another compliance pack may include multiple rules for verifying operational best practices, e.g., as mandated within a business entity.

Different compliance packs may be defined according to a common format. For example, the common format may represent a standardized way to represent or reference various data structures for rules, settings, artifacts, and actions. The data structures are discussed in greater detail below. Compliance packs may be authored by the provider network 190 or by third parties (e.g., industry standards organizations) and may be selected for deployment by clients of the compliance management system 100. Compliance packs may be customized by clients 10 of the compliance management system 100, e.g., by modifying an existing pack, building a pack from a template, or building a pack from scratch. Custom packs may be generated via the user interface 110 and/or APIs offered by the system 100 or repository 170. In one embodiment, a custom compliance pack may combine rules from a HIPAA pack, a GDPR pack, a PCI pack, and/or other specialized compliance packs. Custom packs may be used by the author and/or published to the repository 170 for selection by other users, potentially after verification of the pack's security by a security expert.

A compliance pack 171A may include a plurality of rules 172A that can be evaluated to determine the policy compliance of a resource. For example, a compliance pack associated with PCI may include multiple rules that can be evaluated to determine whether a resource is compliant with credit-card security standards. Rules may also be referred to as configuration rules. In one embodiment, a data structure for a compliance pack rule may indicate a CompliancePackID, ConfigRuleName, ConfigRuleResourceNumber, ConfigRuleArtifactsRepositoryLocation, CreationTime, LastUpdatedTime, and UpdatedBy.

A compliance pack 171A may include one or more settings 173A, e.g., settings associated with rules. For example, settings 173A may define the input parameters, scope, and/or schedule or rules 172A as well as addresses or accounts to be notified of results. Settings 173A may include configuration recorder settings, result aggregation settings, delivery channel settings, and the reporting frequency. Settings 172A may apply to the entire pack 171A or to individual rules 172A. In one embodiment, a data structure for a compliance pack setting may indicate a SettingID, DeliveryChannel, ConfigRecorder, optional Config Aggregator, ServiceRule, CreationTime, LastUpdatedTime, and UpdatedBy.

Each rule in a compliance pack 171A may optionally be associated with one or more artifacts 174A and/or remedial actions 175A. Artifacts 174A in a compliance pack 171A may include documentation of compliance standards, service-level agreement (SLA) documents, descriptions of best practices, escalation matrices, and so on. The artifacts 174A can be presented to users who seek to know more information about why their resources are compliant or noncompliant. In one embodiment, a data structure for a compliance pack artifact may indicate an ArtifactID, ArtifactName, ArtifactType, ArtifactRepositoryLocation, optional ArtifactResourceNumber, CreationTime, LastUpdatedTime, and UpdatedBy.

Remedial actions 175A in a compliance pack 171A may include automated tasks or workflows to be performed for resources found to be noncompliant. Remedial actions for noncompliance may include notifying relevant users, modifying a configuration of a resource, isolating a resource, and so on. For example, a rule in an InfoSec compliance pack may be used to ensure that port 22 on any firewall or security group (cloud-based or on-premises) is not accessible to the Internet, and the port may be closed if it is found to be noncompliant with the relevant rule. Using a single compliance pack, such rules may be applied to disparate resources throughout an enterprise in a consistent manner. In one embodiment, a data structure for a compliance pack action may indicate a CompliancePackID, ActionName, ActionResourceNumber, ActionArtifactsRepositoryLocation, CreationTime, LastUpdatedTime, and UpdatedBy.

Data structures for compliance packs and deployments may reference the data structures discussed above. In one embodiment, a data structure for a published compliance pack may indicate a CompliancePackName, CompliancePackID, CompliancePackAuthor, CompliancePackResourceNumber, CompliancePackSettingsID, ConfigRules, optional Artifacts, CreationTime, LastUpdatedTime, and UpdatedBy. In one embodiment, a data structure for a compliance pack deployment may indicate a CompliancePackID, DeploymentID, DeploymentType (e.g., account, organization, resource group), DeploymentTarget (e.g., AccountID, OrganizationID, ResourceGroupID), CreationTime, LastUpdatedTime, and UpdatedBy.

In some embodiments, a control plane associated with the compliance management system 100 may include APIs such as GetCompliancePackTemplate, PutCompliancePackTemplate, DeleteCompliancePackTemplate, PutCompliancePack, DeleteCompliancePack, and/or DescribeCompliancePack. In some embodiments, a data plane associated with the compliance management system 100 may include an API such as DescribePackLevelCompliance that reports the compliance of the target resources against the applicable rules of the compliance pack (e.g., whether a particular database instance is compliant for a set of HIPAA rules), the evaluation results of each resource type for the compliance pack (e.g., all virtual compute instances that are not HIPAA compliant), the compliance status of the requested compliance pack broken down by individual rules, and/or the compliance status of a specified list of rules within the compliance pack. In some embodiments, a data plane associated with the compliance management system 100 may include an API such as GetPackLevelComplianceDetails that reports which resources are leading to the noncompliance of the account with respect to a particular compliance pack (e.g., which resources are noncompliant with HIPAA rules), which rules within a compliance pack are non-compliant with respect to a given account (e.g., which rules are not met by the account), the reason behind the non-compliance of particular resources, and/or the resources that are non-compliant for a given compliance pack.

Using the compliance management system 100 described herein, clients (users) may easily select and deploy compliance packages to cloud-based resources to determine the policy compliance of those resources. In some embodiments, a user may deploy a compliance package with a single click (or other operation) in a user interface 110, even across an entire enterprise, and have access to a unified view of compliance across the target resources. Results of the deployment and evaluation may be provided to the user in a console (e.g., in the user interface 110) and/or via notifications. The results may include compliance scores or statuses for individual resources (e.g., compliant or noncompliant) for an individual rule. The results may include aggregate compliance scores or statuses for individual resources (e.g., compliant or noncompliant) across a set of rules. The results may include an aggregate compliance score or status for multiple resources (e.g., 80% of resources are compliant and 20% are noncompliant) for an individual rule. The results may include an aggregate compliance score or status for multiple resources (e.g., 80% of resources are compliant and 20% are noncompliant) across a set of rules. The results may indicate any remedial actions taken for noncompliant resources. For example, an instance of policy noncompliance may be remediated according to a remedial action in the corresponding compliance pack by changing the configuration of the resource to ensure compliance. In one embodiment, the results of deployment and evaluation may include one or more output artifacts that capture the compliance status of resources. The output artifact(s) may be usable by external systems or users, e.g., such that policy compliance auditors can certify the policy compliance of resources.

In one embodiment, once a compliance pack has been applied to an account or resource via deployment 140, the pack may be used repeatedly for continuous compliance verification of that account or resource. Results of the continuous compliance may be kept up-to-date in a console for the target account(s) and/or resource(s). Continuous compliance may include compliance verification of existing resources as well as preventative compliance verification of new resources, e.g., before the new resources are provisioned. In one embodiment, to perform preventative compliance verification, the system 100 may interact with a provisioning manager that provisions and/or configures the target resources 185.

As shown in the example of FIG. 1A, the target resources may be hosted in a single provider network 190. In one embodiment, the provider network 190 may be the same entity that offers the system 100 as well as the target resources 185. As shown in the example of FIG. 1B, the target resources 185 and 186 may be hosted in the provider network 190 and one or more other environments 191, such as other multi-tenant provider networks and/or customer premises. The environment illustrated in FIG. 1B may be referred to as a hybrid cloud environment. External resources 186 hosted in other provider networks or on customer premises may be managed by the system 100 using wrappers or intermediate layers that permit the system 100 to issue commands to and receive data from the external resources.

In one embodiment, the compliance management system 100 may be implemented as part of a broader configuration management system for cloud-based resources. The configuration management system may be accessible by users having accounts with the configuration management system (e.g., individual accounts and/or group accounts). The configuration management system may include a console through which users may view the configurations of their resources, track changes in configurations, and apply rules to their resources. Fees for use of the compliance management system 100 and/or configuration management system may be assessed to user accounts. For example, users may be assessed fees based (at least in part) on the number of rules evaluated. In one embodiment, compliance packs from various entities (e.g., third parties unrelated to the provider network and clients) may be selected from a marketplace (e.g., as associated with the repository 170) and leased according to a fee schedule. In one embodiment, the functionality of the system 100 and/or repository 170 may be provided to clients as a web-accessible service.

The clients 10 may represent different processes, systems, and/or computing devices. The clients 10 may be distributed on multiple computing devices throughout one or more networks, including private networks and/or public networks such as the Internet. In various embodiments, the clients 10 may represent external components with respect to the provider networks 190 and 195 or may operate computational resources (e.g., virtual compute instances) within one or more of the provider networks. The clients 10 may interact with the system 100 using one or more application programming interfaces (APIs). For example, if a client seeks to describe a particular compliance pack, then the client may select a "describe compliance pack" option in the user interface 110, and the system 100 may use an appropriate API to obtain a description of the compliance pack and present the description in the user interface. The clients 10 may interact with the user interface 110 via display of the user interface (or a portion thereof) on display devices associated with client devices and via entry of user input into the user interface.

It is contemplated that the system 100 may include additional components not shown, fewer components than shown, or different combinations, configurations, or quantities of the components shown. The system 100 may comprise one or more computing devices, any of which may be implemented by the example computing device 3000 illustrated in FIG. 8. In various embodiments, portions of the system 100 may be provided by the same computing device or by any suitable number of different computing devices. If any of the components of the system 100 are implemented using different computing devices, then the components and their respective computing devices may be communicatively coupled, e.g., via a network. Each of the illustrated components may represent any combination of software and hardware usable to perform their respective functions.

The system 100, repository 170, and/or target resources 185 may be hosted in or otherwise associated with a provider network 190. A provider network may represent a network operated by an entity such as a business or a public-sector organization to provide one or more services (such as various types of cloud-based computing or storage) accessible via the Internet and/or other networks to a distributed set of clients. The services may collaborate to provide virtualized resources to clients. A provider network may include numerous data centers hosting various resource pools 180, such as collections of physical and/or virtualized computer servers, storage devices, networking equipment and the like, that are used to implement and distribute the infrastructure and services offered by the provider. The resources 180 may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

Figure 2A:
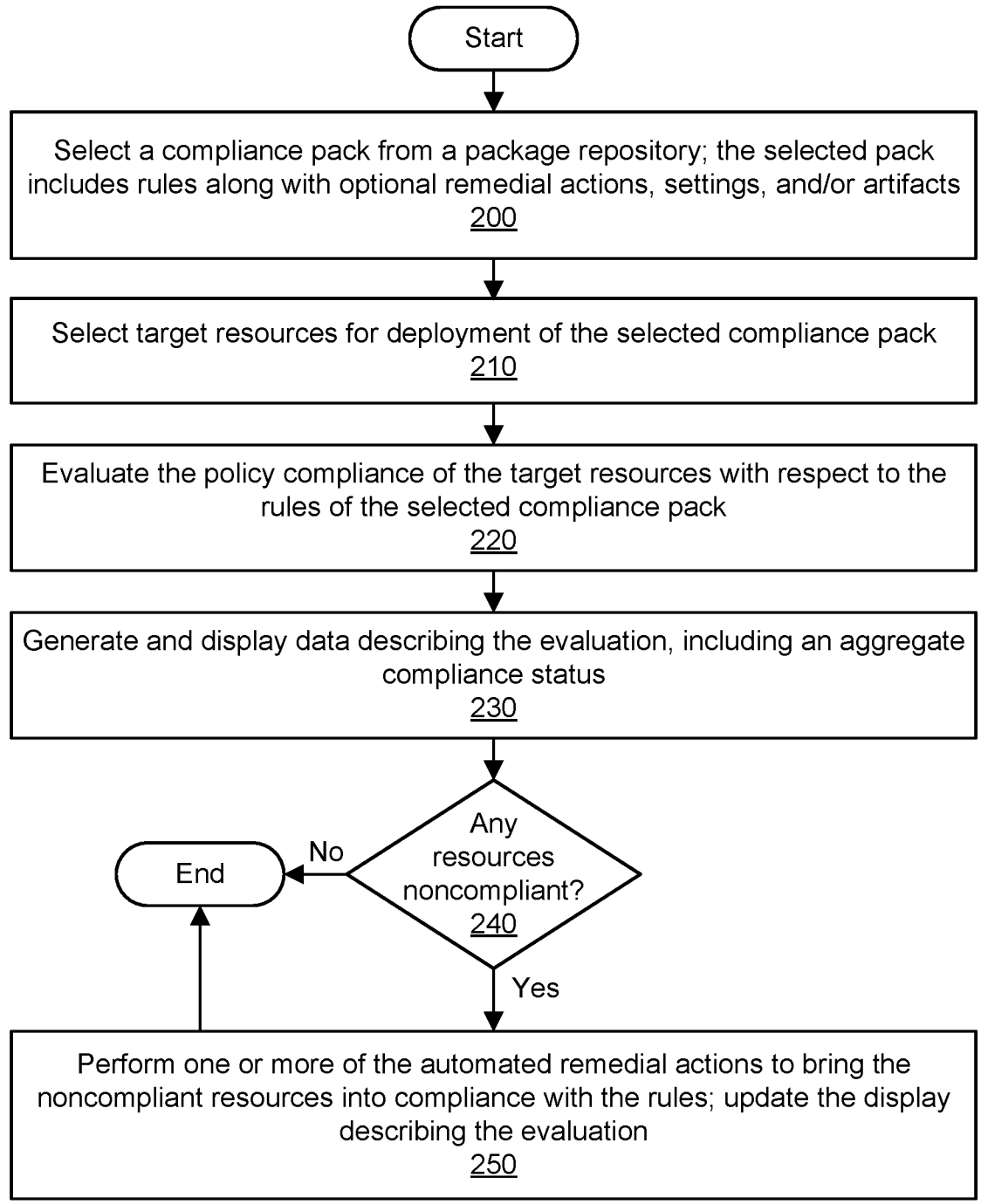
FIG. 2A and FIG. 2B are flowcharts illustrating methods for compliance lifecycle management for cloud-based resources, according to some embodiments.
Figure 2B:
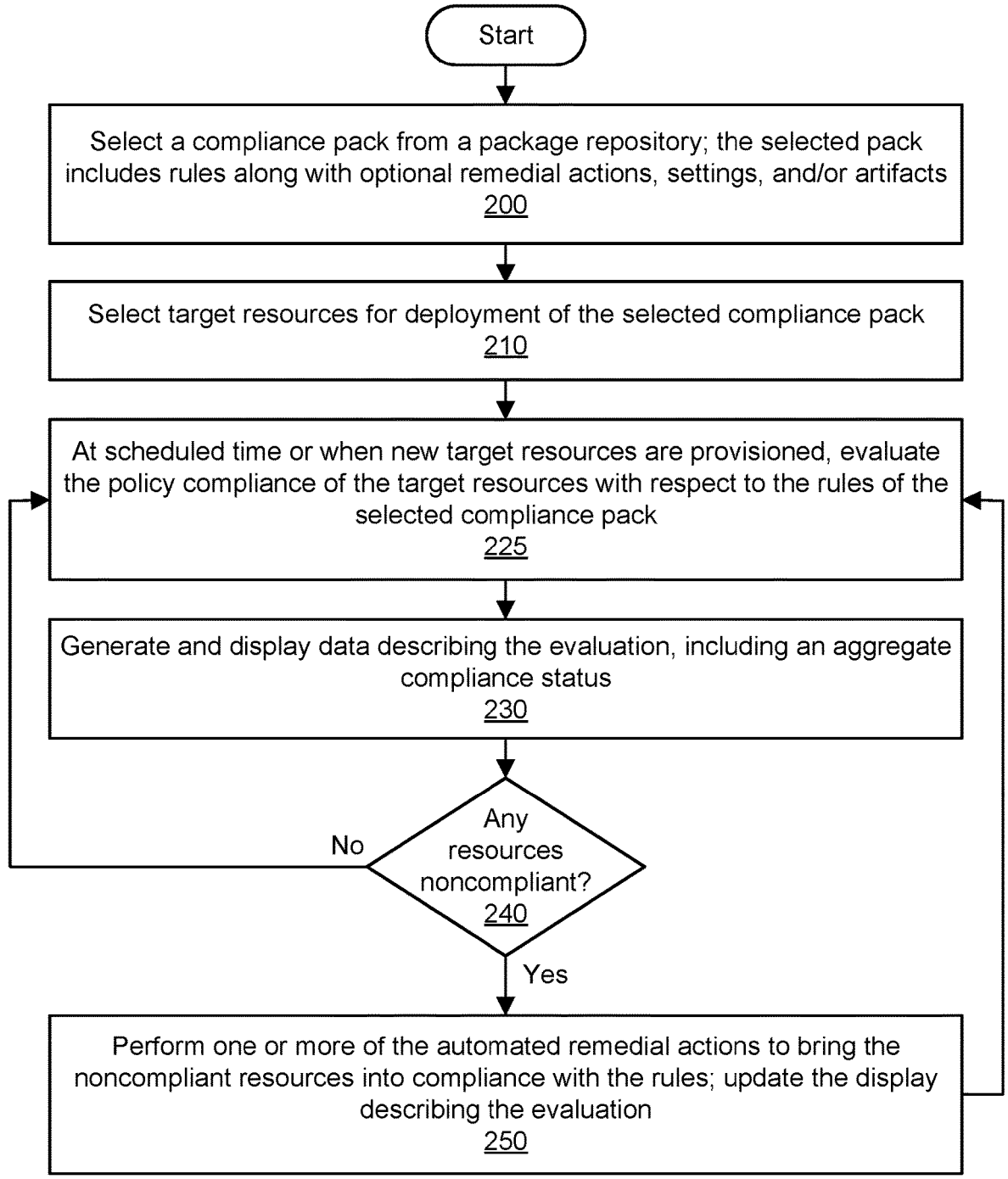

FIG. 2A and FIG. 2B are flowcharts illustrating methods for compliance lifecycle management for cloud-based resources, according to some embodiments. As shown in 200, a compliance pack may be selected from a package repository or other list of available compliance packs. Compliance packs may capture compliance requirements for various standards or policies. The requirements may be issued by a governmental body or an industry standards organization or promulgated internally within a business entity. The compliance pack may be selected according to user input via a user interface, e.g., by clicking on one pack in a list of packs or checking a checkbox beside the name or description of a pack. The selected pack may include a set of rules that can be evaluated to verify the policy compliance of a resource. The selected pack may also include one or more optional actions for remediation of noncompliance, one or more optional settings that influence the evaluation of the rules, and/or one or more optional artifacts that provide documentation or other support for users.

As shown in 210, one or more target resources may be selected for deployment of the selected compliance pack. Resources may include computational resources (e.g., virtual compute instances), applications, services, processes, web servers, database instances, networking components, and so on. The resources may termed "cloud-based" and may be hosted in the cloud. The resources may be hosted in one or more multi-tenant provider networks. In one embodiment, the target resources may be selected according to user input via a user interface, e.g., by clicking on a resource group. In one embodiment, the user account selecting the compliance pack may have access privileges to deploy the compliance pack to one or more resource groups, and those resources may be automatically selected according to a scope associated with a selected pack, where the scope identifies a class of resources to which the pack should be deployed. In such a scenario, the user may verify the membership or description of the resource group before deployment of the selected compliance pack. Target resources may be associated with one or more accounts for which the user has sufficient access privileges to perform compliance management tasks. For example, if a user has sufficient access to a master account for an enterprise, then the user may deploy a compliance pack to the entire enterprise in a simple operation and then view the results of the deployment via a console associated with the master account. In one embodiment, a compliance pack may be deployed to particular regions or divisions of a provider network or other enterprise.

After the selections of the compliance pack and target resources are made, the method may perform automated tasks to deploy the selected compliance pack to the target resources, evaluate the rules in the compliance pack, potentially remediate any noncompliance, and report results back to the client. As shown in 220, for each of the target resources, the method may perform rule evaluation for all the rules in the compliance pack. Rule evaluation may include gathering relevant data that the rules require as input and then determining whether the resource is compliant or noncompliant with the rule.

As shown in 230, the method may generate and display (e.g., in a user interface or via notifications) data describing the evaluation. The data describing the evaluation may include compliance scores or statuses for individual resources (e.g., compliant or noncompliant) for an individual rule. The data describing the evaluation may include compliance scores or statuses for individual resources (e.g., compliant or noncompliant) across a set of rules. The data describing the evaluation may include an aggregate compliance score or status for multiple resources (e.g., 80% of resources are compliant and 20% are noncompliant) for an individual rule. The data describing the evaluation may include an aggregate compliance score or status for multiple resources (e.g., 80% of resources are compliant and 20% are noncompliant) across a set of rules. In one embodiment, the data describing the evaluation may indicate any remedial actions taken for noncompliant resources. For example, an instance of policy noncompliance may be remediated according to a remedial action in the corresponding compliance pack by changing the configuration of the resource to ensure compliance. In various embodiments, the operation shown in 230 may be performed before, after, or concurrently with the operations shown in 240 and 250.

As shown in 240, the method may determine whether any resources were found to be noncompliant with any of the rules in the deployed compliance pack. As shown in 250, for resources found to be noncompliant, the method may perform automated remediation. The automated remediation may include performing one or more of the remedial actions as associated with the relevant rule(s) in the compliance pack. Remedial actions may result in notification of noncompliance to relevant users or other notification targets. Remedial actions may place a previously noncompliant resource in compliance with the rules. Remedial actions for noncompliance may include notifying relevant users, modifying a configuration of a resource, isolating a resource, and so on. When remedial actions are performed, the data describing the compliance of the resources, including the aggregate compliance status, may be updated and displayed, e.g., to indicate that the formerly noncompliant resources are now compliant with the pack.

FIG. 2B illustrates an example of a method for performing continuous compliance using a compliance pack. In one embodiment, once a compliance pack has been deployed to an account or resource, the pack may be used repeatedly for continuous compliance verification of that account or resource. As shown in 225, for each of the target resources, the method may perform rule evaluation for all the rules in the compliance pack repeatedly at appropriate times. In various embodiments, the rule evaluation may be performed when the compliance pack is first deployed, when a new resource is provisioned in the target resources, and/or repeatedly according to a schedule associated with the pack. As shown in 230, results of the continuous compliance may be kept up-to-date in a console for the target account(s) and/or resource(s). Continuous compliance may include compliance verification of existing resources as well as preventative compliance verification of new resources, e.g., before the new resources are provisioned. For example, if the compliance pack has been deployed with a particular account that owns a resource group, and a new resource is added to the resource group, then the method may automatically evaluate the new resource with respect to the rules. In one embodiment, the method may use an anti-entropy mechanism to verify the membership of the target resources before re-applying the rules. For example, if a resource has been moved out of the account associated with the target resources, then the compliance pack may be automatically undeployed from that resource.

Figure 3:
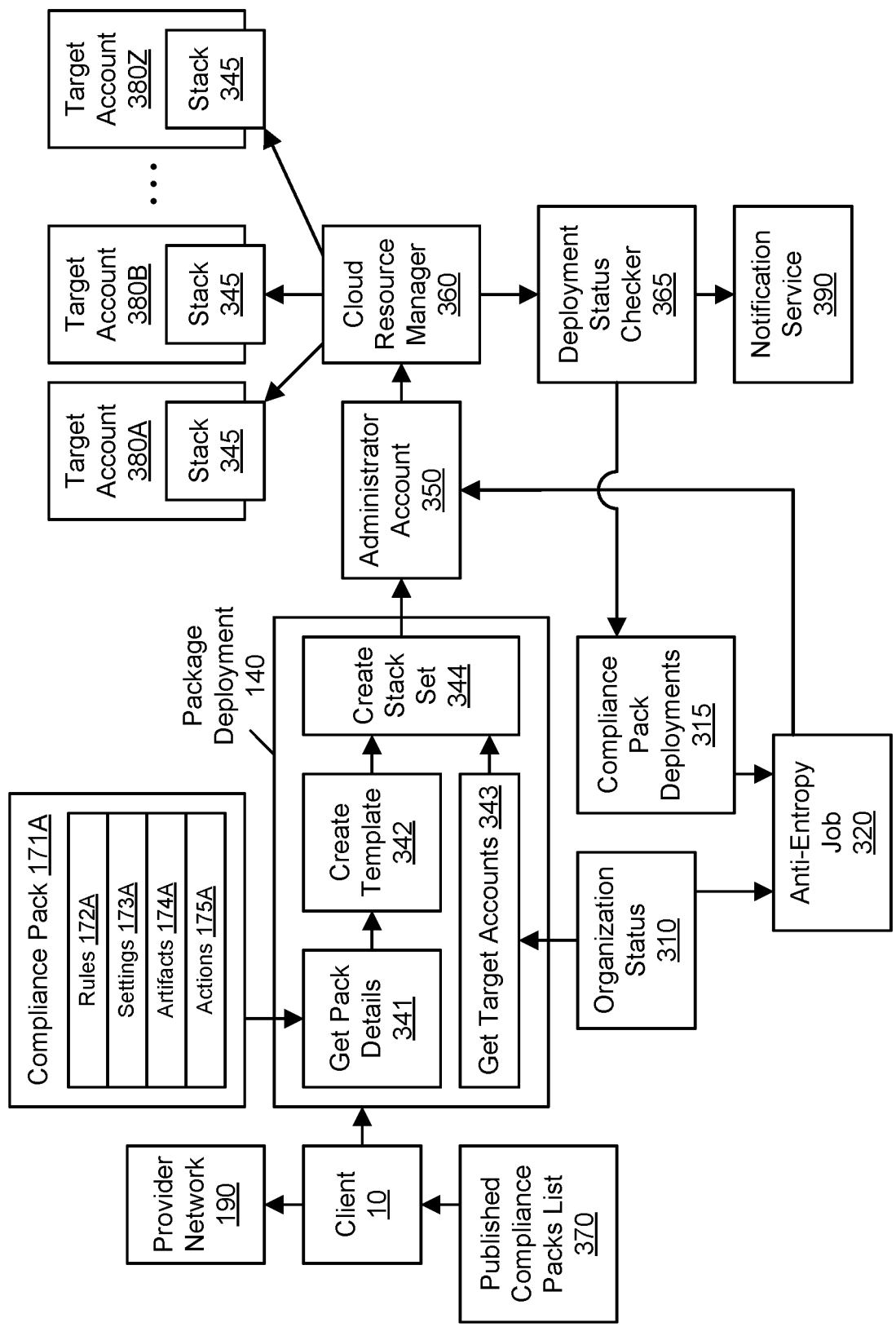
FIG. 3 illustrates further aspects of the example system environments for compliance lifecycle management for cloud-based resources, including a compliance pack deployment workflow, according to some embodiments.

FIG. 3 illustrates further aspects of the example system environments for compliance lifecycle management for cloud-based resources, including a compliance pack deployment workflow, according to some embodiments. In some embodiments, the compliance pack deployment workflow shown in FIG. 3 may be executed when a client deploys an existing managed compliance pack, a third-party compliance pack, or a custom compliance pack in the client's target environment. A client 10 may represent a customer who seeks to deploy a given pack to an account or organization. By interacting with the provider network 190, the client 10 may set up the administrator and target account permissions and roles for the organization. From a published compliance packs list 370, the client 10 may choose a compliance pack to deploy, choose the required input parameters for the pack, and request that the system 100 deploy the pack to a desired scope (e.g., an account, organization, or resource group). The package deployment component 140 may receive the request and get the details 341 of the pack 171A such as the settings, rules, actions, and artifacts. The deployment component 140 may create a template 342 for a cloud resource manager 360 based on the settings, rules, actions, and artifacts. If the deployment is for an organization within the provider network 190, the deployment component 140 may get the target accounts 343 from an organization account status 310. Using the template, the deployment component 140 may create a stack set 344 for the cloud resource manager 360 in the administrator account 350 and desired region(s). The cloud resource manager 360 may replicate the stack 345 to the target accounts 380A and 380B through 380Z. The status of the deployment may be captured by a deployment status checker 365 which may update a compliance pack deployments table 315 on success. The deployment status checker 365 may use a notification service 390 to notify relevant users or accounts, e.g., as indicated in the settings of the compliance pack 171A.

As the list of member accounts in the organization may change over time, an anti-entropy job 320 may be periodically run to automatically deploy the pack to new accounts added to an organization and to automatically remove the pack from accounts that moved out of the organization. The anti-entropy job 320 may periodically iterate through the list of all compliance packs, find which organization(s) each pack is deployed to, determine whether there are any changes to the list of accounts in those organizations, and deploy or delete the corresponding compliance packs if account changes were found.

Figure 4:
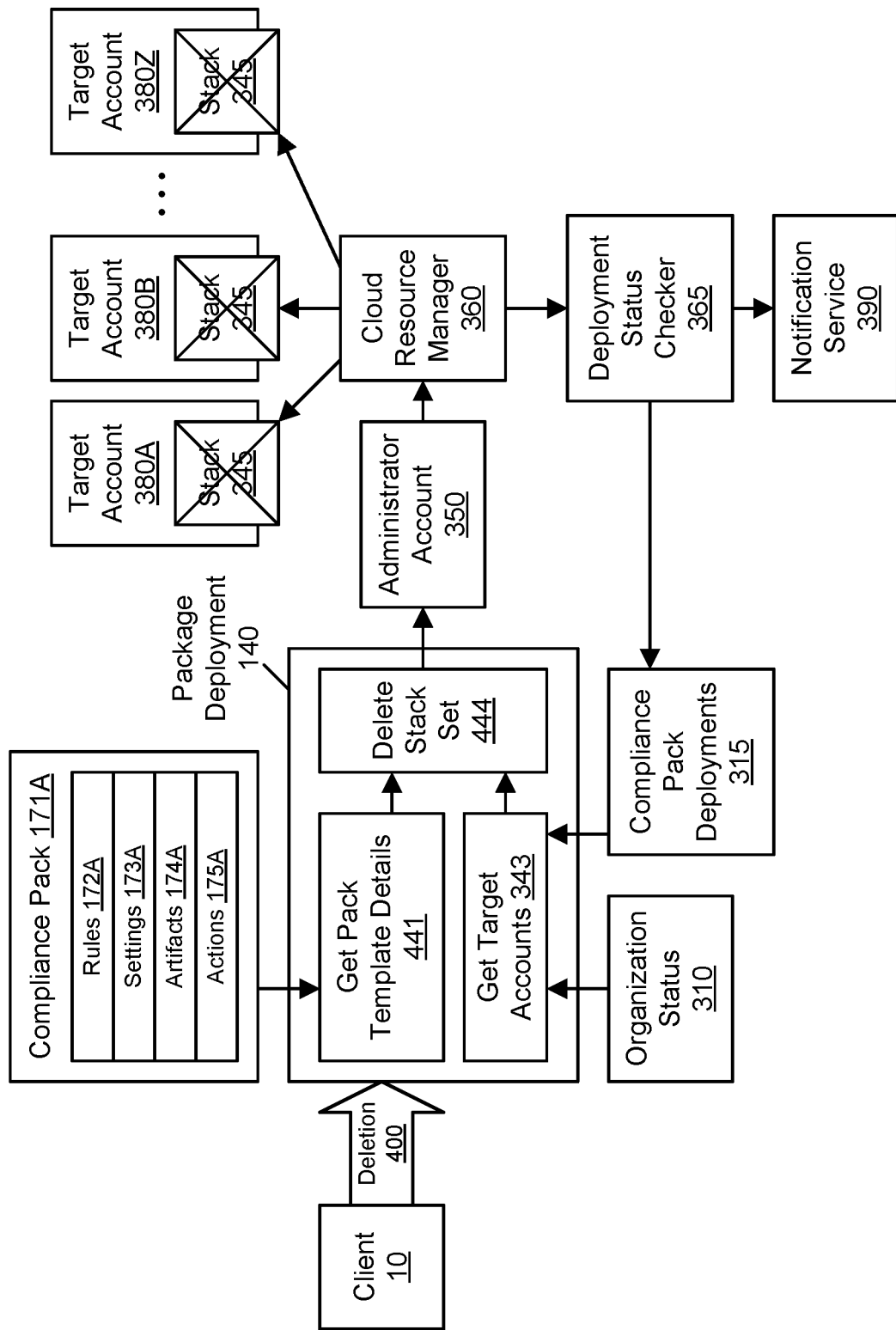
FIG. 4 illustrates further aspects of the example system environments for compliance lifecycle management for cloud-based resources, including a compliance pack deployment deletion workflow, according to some embodiments.

FIG. 4 illustrates further aspects of the example system environments for compliance lifecycle management for cloud-based resources, including a compliance pack deployment deletion workflow, according to some embodiments. In some embodiments, the compliance pack deployment deletion workflow shown in FIG. 4 may be executed when a client removes the deployment of compliance pack from the client's target environment. The client 10 may provide a deletion request 400 that indicates the organization or account from which the compliance pack 171A should be removed. The package deployment component 140 may receive the deletion request 400 and get the details 441 of the related compliance pack template 441. The package deployment component 140 may check whether or not the given deployment actually exists in the system by referring to a table of compliance pack deployments 315. If so, then the package deployment component 140 may call the organization status 310 to get the target accounts 343 and regions. The package deployment component 140 may delete the stack set 444 in the administrator account 350 or other service account. The cloud resource manager 360 may then replicate the deletion of the stack 345 across the target accounts 380A and 380B through 380Z. The deployment status checker 365 may poll the status of the cloud resource manager 360 and update the deployments table 315. The deployment status checker 365 may use the notification service 390 to inform the client 10 or other relevant user(s) about the updated status of the deployment.

Figure 5:
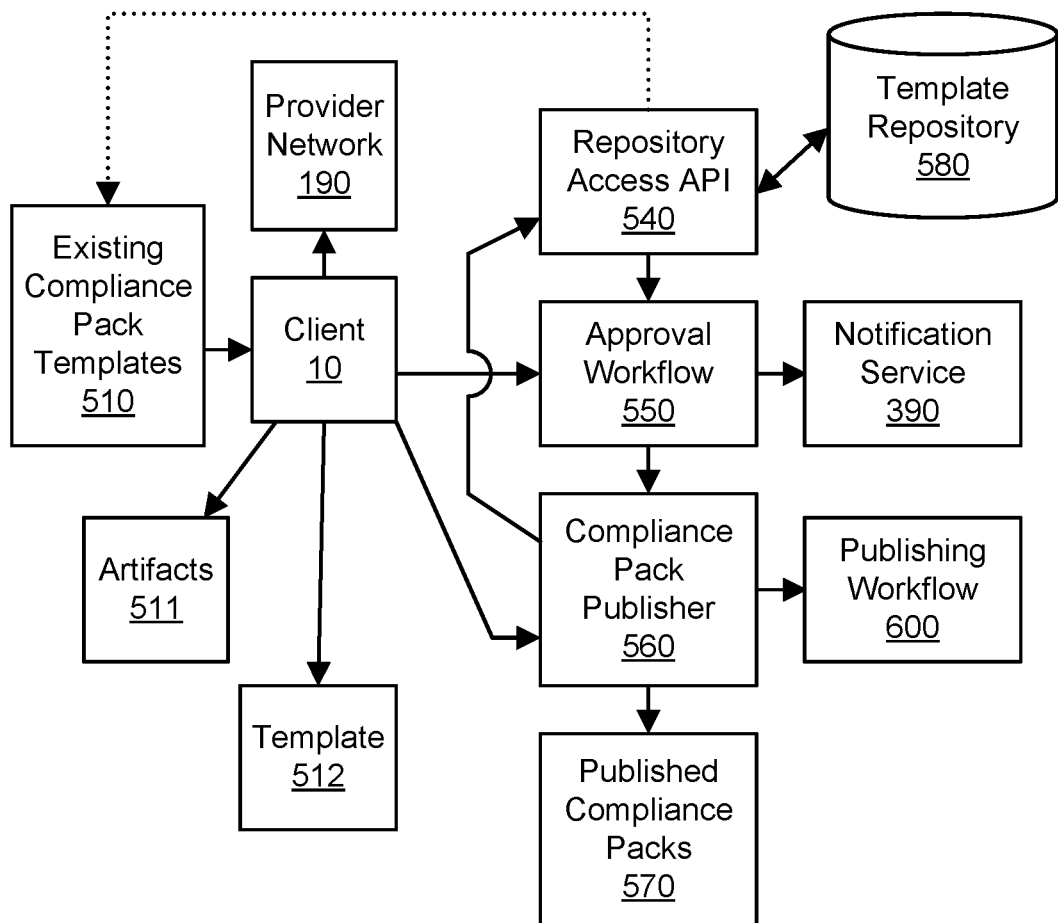
FIG. 5 illustrates further aspects of the example system environments for compliance lifecycle management for cloud-based resources, including a compliance pack authoring workflow, according to some embodiments.

FIG. 5 illustrates further aspects of the example system environments for compliance lifecycle management for cloud-based resources, including a compliance pack authoring workflow, according to some embodiments. In some embodiments, the compliance pack authoring workflow shown in FIG. 5 may be executed when a client authors a custom compliance pack. A client 10 may create a role in their administrator account in the provider network 190 with sufficient privileges to for the system 100 to create specific resources in the admin account. The resources may include a compliance pack, config recorder, delivery channel, and functions to be executed by a cloud-based execution service. Such a step may not be required for existing managed packs that are provided by the provider network 190. The client 10 may then create the artifacts 511 and template 512 associated with the custom pack. The client 10 may use existing compliance pack templates 510 as the basis for the custom pack or may instead create the custom pack from scratch. The artifacts 511 may include .jar or .zip files containing relevant program code and/or text files for documentation and related procedures. The client 10 may then update the template 512 and provide locations of the newly created artifacts 511. The client 10 may validate the syntax and semantics of the template 512 using a validation tool provided by the system 100. The client 10 may then publish the template so that it can be used by others for compliance management. A compliance pack publisher 560 may receive the request, retrieve the artifacts 511 from their locations specified in the template 512, and store them in a versioned template repository 580 as an immutable package. The repository 580 may be accessed using a repository access API 540. The authoring workflow may invoke an automated approval workflow 550 that validates the template, e.g., using sanity checks for best practices of data security. The outcome of the approval workflow 550 may be asynchronously provided to the client 10 via the notification service 390, as specified in the delivery channel. The outcome may also be persisted in durable storage. Once approved, the resources may be created in the corresponding administrator account, and the pack may be made available in a set of published compliance packs 570 for authorized users to select and deploy. The compliance pack publisher 560 may also set off a publishing workflow 600 to be described below.

Figure 6:
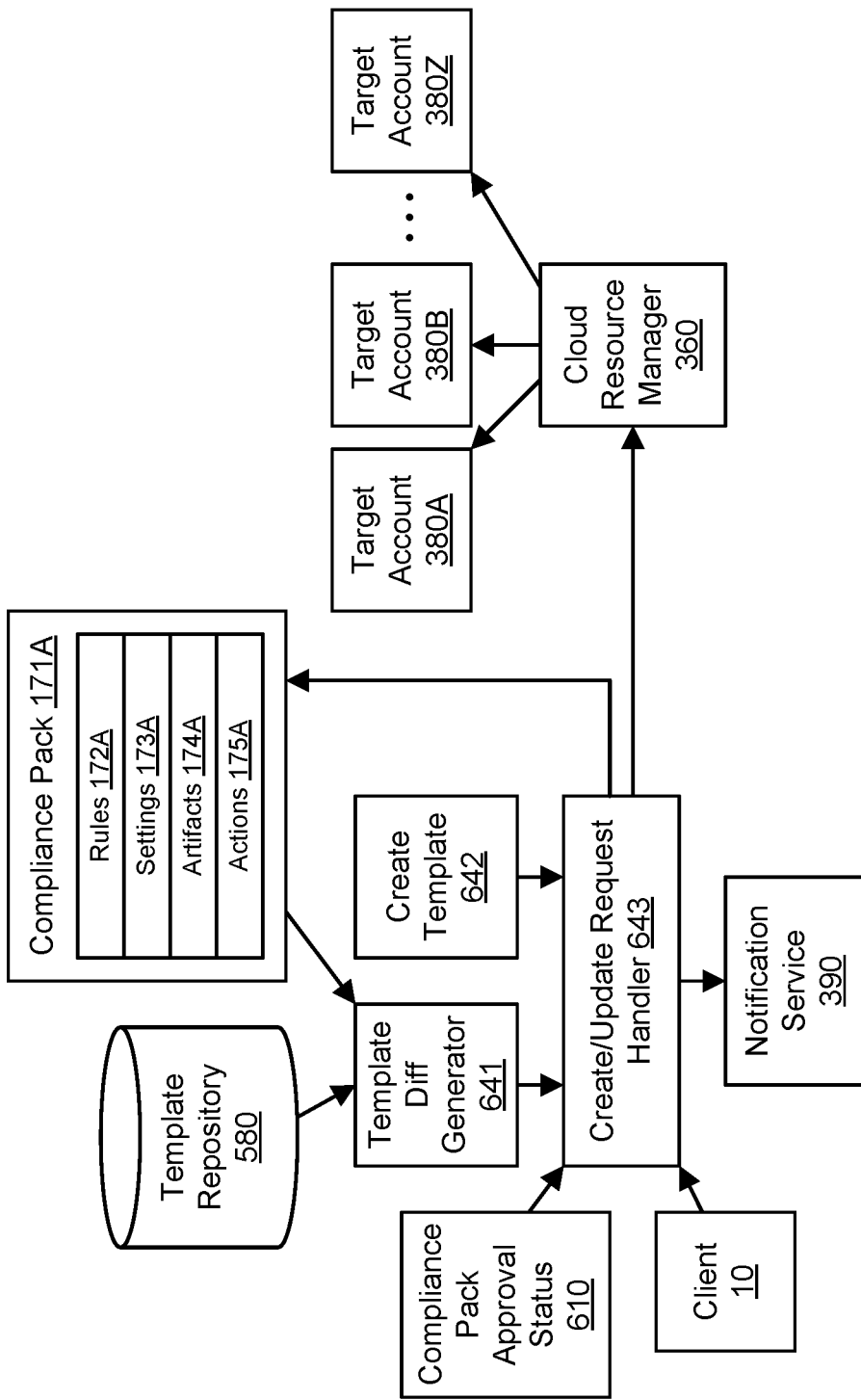
FIG. 6 illustrates further aspects of the example system environments for compliance lifecycle management for cloud-based resources, including a compliance pack publishing workflow, according to some embodiments.

FIG. 6 illustrates further aspects of the example system environments for compliance lifecycle management for cloud-based resources, including a compliance pack publishing workflow, according to some embodiments. In some embodiments, the compliance pack publishing workflow shown in FIG. 6 may be executed when a client publishes a custom compliance pack. The client 10 may request to publish a new template or an update to an existing template. In the latter case, the existing compliance pack may have been previously deployed in some accounts or organizations. A template create/update request handler 643 may receive the publishing request. The request handler 643 may check whether the approval status 610 of the pack. If not approved, the publishing request may be rejected. If the pack has been approved, the request handler 643 may fetch the related artifacts and determine which compliance pack components should be updated for the request. For creation of a new pack, the settings, artifacts, rules, and actions may be updated. For an update to an existing pack, only the modified settings, artifacts, rules, and actions may be updated, as identified using a template diff generator 641. The request handler 643 may create a cloud resource management template 642 and call the cloud resource manager 360 to deploy the latest changes to the target accounts 380A and 380B through 380Z. If the stack creation fails, the cloud resource manager 360 may roll back the intermediate changes. If the stack creation succeeds, the request handler 643 may update the information in various compliance pack tables. Using the notification service 390, the workflow may inform the client 10 or other user(s) of the results of the publishing.

Figure 7:
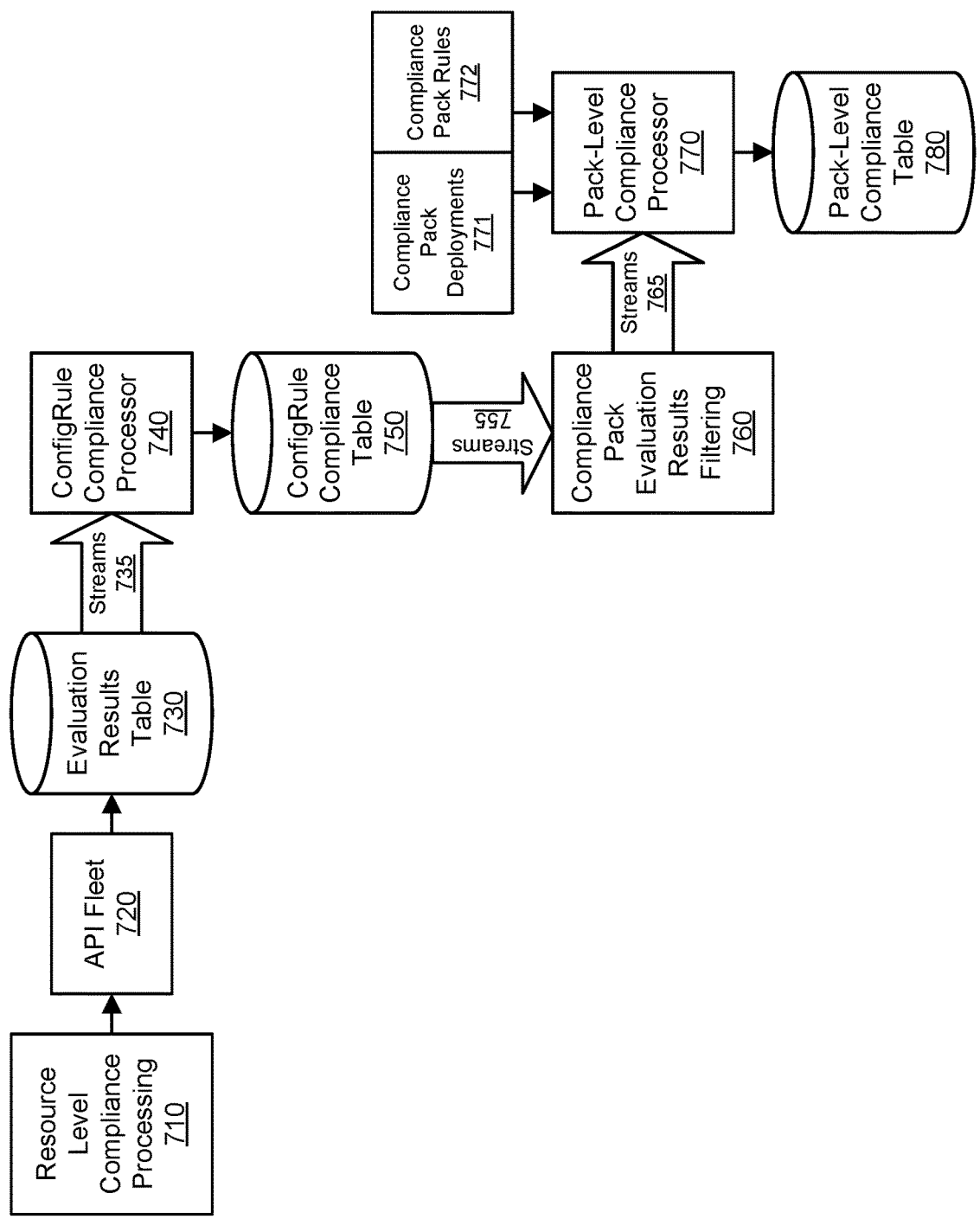
FIG. 7 illustrates further aspects of the example system environments for compliance lifecycle management for cloud-based resources, including a compliance pack evaluation workflow, according to some embodiments.

FIG. 7 illustrates further aspects of the example system environments for compliance lifecycle management for cloud-based resources, including a compliance pack evaluation workflow, according to some embodiments. In some embodiments, the compliance pack evaluation workflow shown in FIG. 7 may be executed for configuration rule evaluation and aggregation across multiple accounts and/or multiple regions using compliance packs. The evaluation workflow may build a layer of package-level aggregation on top of a single-config-rule evaluation system. A resource level compliance processing engine 710 may call an API fleet 720 to generate information usable to populate an evaluation results table 730. Updates to the evaluation results table 730 may be published using one or more streams 735. A config rule compliance processor 740 may calculate the config rule level compliance for compliance pack rules and populate a config rule compliance table 750 accordingly. Updates to the config rule compliance table 750 may be published using one or more streams 755. Compliance pack evaluation results filtering 760 may filter out any evaluation results not related to compliance packs. The filtering 760 may be implemented using a cloud-based function execution service. The pack-specific results may be published using one or more streams 765 and consumed by a pack-level compliance processor 770. The pack-level compliance processor 770 may also refer to the compliance pack deployments 771 and compliance pack rules 772. The pack-level compliance processor 770 may persist the results of the pack-level compliance processing in a pack-level compliance table 780. Using these techniques, a resource may be evaluated with respect to multiple rules in a compliance pack, and the results of the individual rule evaluations may be aggregated into a pack-level evaluation result.

Illustrative Computer System

Figure 8:
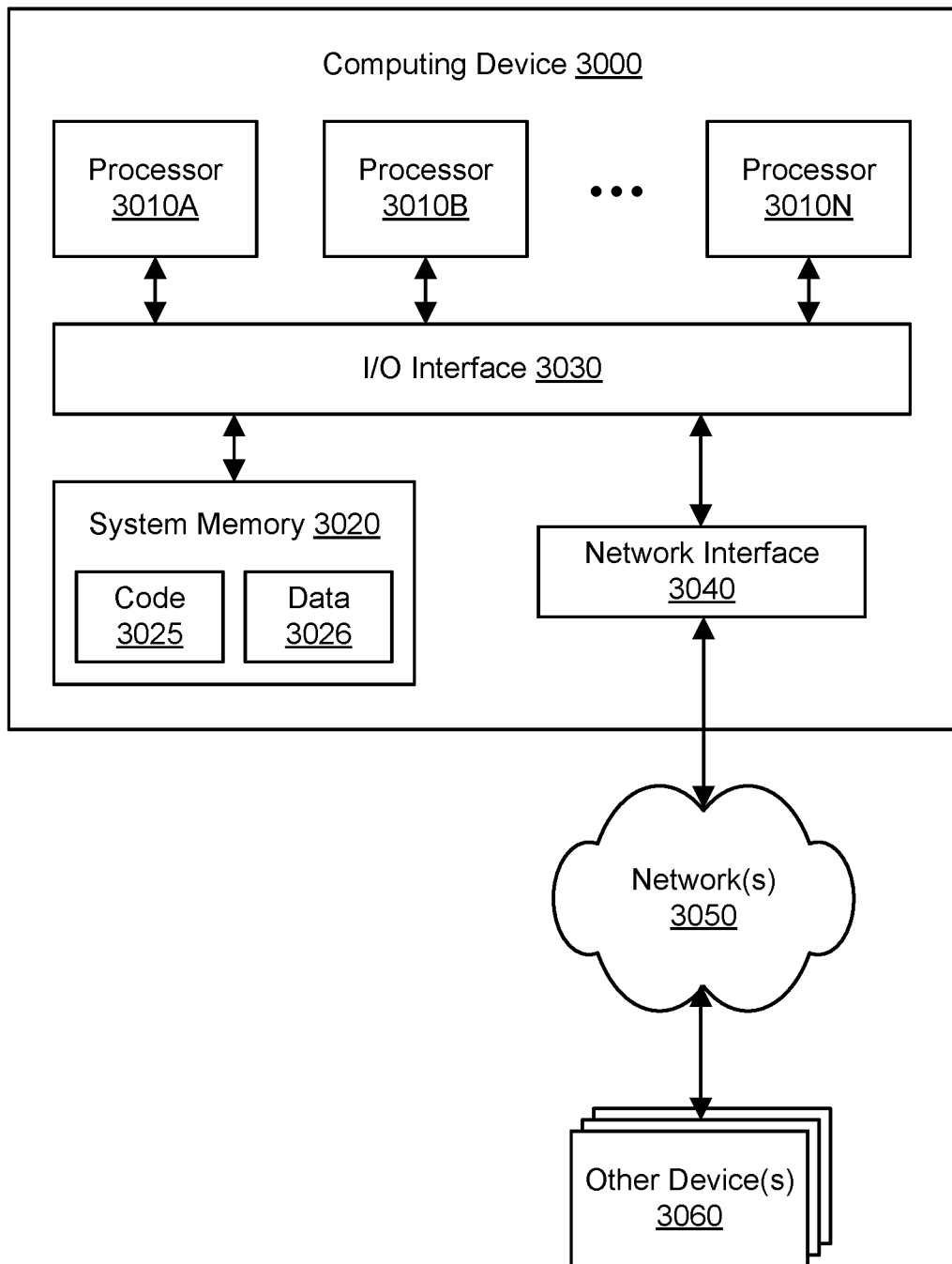
FIG. 8 illustrates an example computing device that may be used in some embodiments.

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a compliance management system comprising one or more processors and one or more memories to store computer-executable instructions that, when executed, cause the one or more processors to:
assign a policy set to one or more resources hosted by a cloud provider, wherein the policy set comprises a plurality of policy definitions, and wherein the one or more resources use or access data that are subject to one or more of the policy definitions;
perform an evaluation of compliance of the one or more resources with respect to the plurality of policy definitions of the policy set;
determine, based at least in part on the evaluation, that at least one of the resources fail to comply with at least one of the policy definitions; and
perform one or more automated remediation tasks, wherein the one or more automated remediation tasks are associated with the at least one of the resources that fail to comply with the at least one of the policy definitions.

2. The system as recited in claim 1, wherein the one or more automated remediation tasks comprise modifying a configuration of the at least one of the resources that fail to comply with the at least one of the policy definitions.

3. The system as recited in claim 1, wherein the one or more automated remediation tasks comprise isolating the at least one of the resources that fail to comply with the at least one of the policy definitions.

4. The system as recited in claim 1, wherein the one or more automated remediation tasks place the at least one of the resources in compliance with the plurality of policy definitions.

5. The system as recited in claim 1, wherein the one or more memories store additional computer-executable instructions that, when executed, cause the one or more processors to:
generate and display data describing the evaluation, wherein the data describing the evaluation comprises an aggregate compliance status for at least one of the one or more resources, wherein the aggregate compliance status represents an aggregate compliance with the plurality of policy definitions.

6. The system as recited in claim 1, wherein the one or more memories store additional computer-executable instructions that, when executed, cause the one or more processors to:
perform additional evaluations of the compliance of the one or more resources with respect to the plurality of policy definitions of the policy set, wherein the additional evaluations are performed according to a schedule described in the policy set; and
generate and display updated data describing the additional evaluations, wherein the updated data describing the additional evaluations comprises one or more updated aggregate compliance statuses.

7. A method, comprising:
assigning a policy set to one or more resources hosted by a cloud provider, wherein the policy set comprises a plurality of policy definitions, and wherein the one or more resources use or access data that are subject to one or more of the policy definitions;
performing an evaluation of compliance of the one or more resources with respect to the plurality of policy definitions of the policy set;
determining, based at least in part on the evaluation, that at least one of the resources fail to comply with at least one of the policy definitions; and
performing one or more automated remediation tasks, wherein the one or more automated remediation tasks are associated with the at least one of the resources that fail to comply with the at least one of the policy definitions.

8. The method as recited in claim 7, wherein the one or more automated remediation tasks comprise modifying a configuration of the at least one of the resources that fail to comply with the at least one of the policy definitions.

9. The method as recited in claim 7, wherein the one or more automated remediation tasks comprise isolating the at least one of the resources that fail to comply with the at least one of the policy definitions.

10. The method as recited in claim 7, wherein the one or more automated remediation tasks place the at least one of the resources in compliance with the plurality of policy definitions.

11. The method as recited in claim 7, further comprising:
generating and displaying data describing the evaluation, wherein the data describing the evaluation comprises an aggregate compliance status for at least one of the one or more resources, wherein the aggregate compliance status represents an aggregate compliance with the plurality of policy definitions.

12. The method as recited in claim 7, further comprising:
performing additional evaluations of the compliance of the one or more resources with respect to the plurality of policy definitions of the policy set, wherein the additional evaluations are performed according to a schedule described in the policy set; and
generating and displaying updated data describing the additional evaluations, wherein the updated data describing the additional evaluations comprises one or more updated aggregate compliance statuses.

13. The method as recited in claim 7, wherein the policy set is selected using a policy set marketplace, wherein the plurality of policy sets are listed and described in the policy set marketplace.

14. One or more non-transitory computer-readable storage media storing program instructions that, when executed on or across one or more processors, perform:
assigning a policy set to one or more resources hosted by a cloud provider, wherein the policy set comprises a plurality of policy definitions, and wherein the one or more resources use or access data that are subject to one or more of the policy definitions;
performing an evaluation of compliance of the one or more resources with respect to the plurality of policy definitions of the policy set;
determining, based at least in part on the evaluation, that at least one of the resources fail to comply with at least one of the policy definitions; and
performing one or more automated remediation tasks, wherein the one or more automated remediation tasks are associated with the at least one of the resources that fail to comply with the at least one of the policy definitions.

15. The one or more non-transitory computer-readable storage media as recited in claim 14, wherein the one or more automated remediation tasks comprise modifying a configuration of the at least one of the resources that fail to comply with the at least one of the policy definitions.

16. The one or more non-transitory computer-readable storage media as recited in claim 14, wherein the one or more automated remediation tasks comprise isolating the at least one of the resources that fail to comply with the at least one of the policy definitions.

17. The one or more non-transitory computer-readable storage media as recited in claim 14, wherein the one or more automated remediation tasks place the at least one of the resources in compliance with the plurality of policy definitions.

18. The one or more non-transitory computer-readable storage media as recited in claim 14, further comprising additional program instructions that, when executed on or across the one or more processors, perform:
generating and displaying data describing the evaluation, wherein the data describing the evaluation comprises an aggregate compliance status for at least one of the one or more resources, wherein the aggregate compliance status represents an aggregate compliance with the plurality of policy definitions.

19. The one or more non-transitory computer-readable storage media as recited in claim 14, further comprising additional program instructions that, when executed on or across the one or more processors, perform:
performing additional evaluations of the compliance of the one or more resources with respect to the plurality of policy definitions of the policy set, wherein the additional evaluations are performed according to a schedule described in the policy set; and
generating and displaying updated data describing the additional evaluations, wherein the updated data describing the additional evaluations comprises one or more updated aggregate compliance statuses.

20. The one or more non-transitory computer-readable storage media as recited in claim 14, wherein the policy set is selected using a policy set marketplace, wherein the plurality of policy sets are listed and described in the policy set marketplace.

* * * * *